(12) United States Patent
Takahashi et al.

(10) Patent No.: US 7,830,779 B2
(45) Date of Patent: Nov. 9, 2010

(54) METHOD OF RECORDING INFORMATION, EQUIPMENT THEREOF AND INFORMATION RECORDING MEDIUM

(75) Inventors: Katsuyuki Takahashi, Neyagawa (JP); Kenichi Nishiuchi, Hirakata (JP); Naoyasu Miyagawa, Kawanishi (JP); Takashi Nishihara, Hirakata (JP)

(73) Assignee: Panasonic Corporation, Osaka (JP)

( * ) Notice: Subject to any disclaimer, the term of this patent is extended or adjusted under 35 U.S.C. 154(b) by 1181 days.

(21) Appl. No.: 10/947,255

(22) Filed: Sep. 23, 2004

(65) Prior Publication Data

US 2005/0078594 A1 Apr. 14, 2005

(30) Foreign Application Priority Data

Oct. 8, 2003 (JP) .............................. 2003-349420

(51) Int. Cl.
G11B 7/24 (2006.01)
(52) U.S. Cl. .............. 369/275.2; 369/47.21; 369/59.23; 369/94; 369/284; 369/288
(58) Field of Classification Search .............. 369/275.2, 369/59.23, 47.21, 94, 284, 288
See application file for complete search history.

(56) References Cited

U.S. PATENT DOCUMENTS

| | | | | |
|---|---|---|---|---|
| 5,946,286 A * | 8/1999 | Bahns | ..................... | 369/275.3 |
| 6,052,465 A * | 4/2000 | Gotoh et al. | ............. | 369/53.21 |
| 6,656,559 B2 | 12/2003 | Mizushima et al. | | |
| 7,061,850 B1 * | 6/2006 | Irie et al. | ................. | 369/59.24 |
| 7,082,094 B2 * | 7/2006 | Morishima et al. | .......... | 369/116 |
| 7,106,687 B1 | 9/2006 | Richter et al. | | |
| 7,304,937 B1 * | 12/2007 | Xie | .......................... | 369/272.1 |
| 2003/0031109 A1 * | 2/2003 | Lee et al. | ................. | 369/59.25 |

(Continued)

FOREIGN PATENT DOCUMENTS

CN 1347107 5/2002

(Continued)

OTHER PUBLICATIONS

ECMA Standardizing Information and Communication Systems "80 mm DVD—Read-Only Disk", Standard ECMA-268 $2^{nd}$ Edition—Dec. 1999.

(Continued)

*Primary Examiner*—Wayne R Young
*Assistant Examiner*—Linh T Nguyen
(74) *Attorney, Agent, or Firm*—Wenderoth, Lind & Ponack, L.L.P.

(57) ABSTRACT

Because conditions for recording identification data of a medium vary in accordance with the structure of different media, such as a single-layer or a multiple-layer structure, stable data recording has been a difficult task. To solve this problem, an incident side of the laser beam for recording identification data on a single-layer optical disk 5 and a double-layer optical disk 6 is the opposite side of a substrate 1 upon which user data is recorded. From this structure, even in a double-layer optical disk 6, the recording is not affected by the recording layer of a second layer 12b and the like. Therefore, in the double-layer optical disk 6, identification data of the medium can be recorded under the same conditions as the single-layer optical disk 5.

11 Claims, 7 Drawing Sheets

U.S. PATENT DOCUMENTS

| | | | |
|---|---|---|---|
| 2003/0076775 | A1 | 4/2003 | Sato et al. |
| 2003/0161224 | A1* | 8/2003 | Anderson et al. ........ 369/30.58 |
| 2003/0179679 | A1* | 9/2003 | Morishima .................. 369/108 |
| 2004/0166439 | A1* | 8/2004 | Ohkubo ................. 430/270.13 |

FOREIGN PATENT DOCUMENTS

| | | |
|---|---|---|
| EP | 1 308 938 | 5/2003 |
| JP | 62-149050 | 7/1987 |
| JP | 11-66621 | 3/1999 |
| JP | 2000-339756 | 12/2000 |
| JP | 2001-243636 | 9/2001 |
| JP | 2005-11435 | 1/2005 |
| WO | 02/37483 | 5/2002 |

OTHER PUBLICATIONS

Japanese Office Action issued Jan. 27, 2009 in Japanese Application No. 2004-289713, which is a foreign counterpart of the present application.

European Office Action issued Apr. 27, 2010 in European Application No. 04 022 262.2-1232, which is a foreign counterpart of the present application.

Uno et al., "Dual-layer write-once media for 1x-4x speed recording based on Blu-ray Disc format", Proceedings of SPIE, Conf. Physics of Semiconductor Devices—20011211 to 20011215, vol. 5069, No. 1, May 14, 2003, pp. 82-89.

Kitaura et al., "Multi-layer Write-once media with Te-O-Pd Films utilizing a Violet Laser", Proceedings of SPIE, conf Physics of Semiconductor Devices—20011211 to 20011215, vol. 4342, Apr. 22, 2001, pp. 340-347.

Isao Satoh, "Next-Generation Blue-Violet Laser Multi-Layer Optical Recording", XP002203753 Retrieved from the Internet: URL: http://www.evcos.org p[retrieved on Jun. 27, 2002].

European Search Report issued Jan. 24, 2008 in conjunction with EP application No. 04022262.2 - 1232 which is a counterpart to the present application.

* cited by examiner

Laser beam for recording
identification data of medium

METHOD OF RECORDING INFORMATION, EQUIPMENT THEREOF AND INFORMATION RECORDING MEDIUM

BACKGROUND OF THE INVENTION

1. Field of the Invention

The present invention relates to an information recording medium, a method of recording information thereon, and equipment thereof.

2. Description of the Prior Art

Recently, due to increasing information recording capacity of an optical recording medium, increasing distribution of information which is recorded on an optical recording medium and improving protection techniques against illegal copies, a technique for recording identification data on all optical recording media is desired for security purposes.

To service this demand, as recording identification data on an optical recording medium for example, the following technique is generally used: preparing a write-once type area (Burst Cutting Area, hereinafter referred to as a "BCA") on which a barcode is overwritten on a pit of a read-only optical recording medium, and then during manufacturing of the optical recording medium, recording identification data (ID data) which is different in each optical recording medium and recording an encryption key or a reproducing key if necessary, on the BCA area.

On the other hand, a write-once optical information recording medium having an information layer which can record a signal only once and also including a plurality of recording layers, and a rewritable optical information recording medium having an information layer which can rewrite an information signal a number of times have been developed. Thus, various kinds of media have appeared (hereinafter, referred to as a "single-layer optical disk" including both the write-once type and the rewritable type). Furthermore, an optical disk having a plurality of recording layers which enables the recording of high-capacity information such as Hi-Vision images has been put into practical use (hereinafter, referred to as a "multiple-layer optical disk" including both the write-once type and the rewritable type).

In the single-layer or the multiple-layer optical disk, because information can be recorded without any particular restrictions, the emphasis on information handling for security purposes has increased.

As a method for recording ID data on an optical disk, an example of making the BCA by producing an amorphous portion and a crystalline portion alternatively by applying a laser beam onto a phase-changeable optical disk and using the difference of a reflecting ratio is proposed (see for example, Japanese unexamined patent publication 2001-243636, p. 16, FIG. 3, hereinafter referred to as reference 1).

However, in the conventional structure presented above, the identification data of a medium is recorded by applying a laser beam from the side at which information is recorded and reproduced. Therefore, the conditions for recording the identification data on a recording layer farthest from the laser incident side in a multiple-layer optical disk need to be greatly changed compared to those of a single-layer optical disk, because the effect of a front-side layer should be taken into consideration. This can complicate BCA producing equipment. In addition, when using recording materials which generally have a high wavelength dependency such as organic dyes, because the recording conditions can vary due to even a slight change in recording wavelength or in optical properties of the dye material, stable recording has been a difficult task.

Furthermore, because the recording medium of reference 1 is a rewritable phase-changeable recording medium, the recording mode during processing of the BCA is the same as the mode for deleting information in a usual recording process. In this instance, because the medium has fairly low temperature in the recording mode, it is rare that the recording layer is damaged during the processing. On the other hand, a recording mode during processing of the BCA of a write-once phase-changeable recording medium is the same as the mode for recording information in a usual recording process. In this situation, a high temperature is necessary. In addition, the recording is performed using a large laser spot, which means the recording is performed by supplying an energy that is several hundred times higher than for usual recording. Thus, a hot section is produced over a significantly large area on the recording layer, and the recording layer is damaged. This causes the problem of decreasing the signal quality when reproducing the BCA.

SUMMARY OF THE INVENTION

An object of the present invention is to solve the conventional problems, and to provide a method for easily and stably recording identification data of a medium, even when using the write-once recording medium or having a recording material with a high wavelength dependency, as well as equipment thereof and an optical disk having a BCA pattern thereon.

To solve the problems mentioned above, in both information recording equipment and a method, an optical pickup for recording information on an information recording medium is provided at a side opposite to where user data is recorded/reproduced, and identification data of a medium is recorded using a laser beam.

From this structure, regardless of the number of information recording layers, the identification data can be recorded under the same recording conditions, because the path of the laser beam from the entrance point to the recording point of the identification data is equal.

In addition, in the method of recording information of the present invention, the medium preferably has a light absorption layer between the surface of the side opposite to where user data is recorded/reproduced and the information recording layer, and the identification data is preferably recorded on the information recording layer by heat propagation caused by heating the light absorption layer using the laser beam.

From this structure, because the recording on the information recording layer is performed indirectly through the light absorption layer, the identification data is stably recorded by reducing the deformation of the information recording layer caused by heat.

The light absorption layer of the medium used in the method of recording information of the present invention functions as a reflecting layer when recording or reproducing user data.

From this structure, preparing a new light absorption layer is not necessary, and the identification data can be recorded at high quality and low cost.

In the method of recording information of the present invention, a width of the focusing spot of the laser beam which is applied to the light absorption layer during the recording is preferably narrower than that of a shortest mark of the identification data.

From this structure, because mark broadening caused by heat propagation can be reduced, the identification data can be recorded at high quality.

In addition, in the method of recording information of the present invention, the laser beam is defocused on the light absorption layer, and the information recording equipment of the present invention includes a focusing control unit which causes the beam to defocus.

From this structure, because the light diffuses moderately and the recording layer does not receive a drastic change of temperature, the recording layer and the substrate are unlikely to get physically damaged.

If the amount of defocusing of the beam is too small, the effect from using the beam defocusing can not be obtained. On the other hand, if it is too large, a high laser power is necessary. Therefore, a range of focusing is preferably between −2 and −10 or +2 and +10 times longer than the focusing depth.

Moreover, an information recording medium used in the method of the present invention preferably has an information recording layer composed of a phase-changeable recording material.

From this structure, the identification data can be recorded at high quality by using the difference of a reflecting ratio between a crystalline state and a non-crystalline state. The information recording layer is composed of a write-once phase-changeable recording material, and the identification data is recorded by changing a non-crystalline phase of the information recording layer to a crystalline phase. In this situation, although the temperature of the information recording layer becomes high, because the recording on the information recording layer is indirectly performed through the light absorption layer, the identification data is stably recorded by reducing the deformation of the information recording layer caused by heat.

In addition, in the medium used in the method of the present invention, the information recording layer is preferably composed of an organic dye recording material.

From this structure, because the organic dye recording material will record heat generated from the light absorption layer, and the slight light absorption characteristics of the dye material will not be affected, the information can be stably recorded.

The information recording equipment of the present invention includes a centering mechanism unit at a position at which the medium is attached. The centering mechanism is operable to correct a center position of the medium at an inner circumferential zone of a side opposite to where light enters from the optical pickup.

From this structure, when the optical pickup in which the laser is applied vertically downward is used (for safety reasons), because the centering can be performed at the side opposite to the optical pickup operation, information recording equipment can be realized in which disk attachment is performed by air suction, and which is superior for mass production.

According to the method of recording information of the present invention, because identification data of a medium is recorded by applying a laser beam from a side opposite to where user data is recorded/reproduced, a BCA pattern can be formed easily and stably, regardless of whether using a single-layer or a multiple-layer optical disk and even when using recording materials which generally have a high wavelength dependency.

BRIEF DESCRIPTION OF THE DRAWINGS

FIG. 6(a) is an explanatory diagram showing a recording mechanism of the Embodiment of the present invention, and (b) is an explanatory diagram showing a conventional technique.

DESCRIPTION OF THE PREFERRED EMBODIMENTS

Hereinafter, an embodiment of the present invention will be described by referring to the figures. Note that, the explanations below show an example of an information recording layer made of a write-once phase-changeable recording material, however, these explanations can also be applied to an information recording layer made of a rewritable phase-changeable recording material or an organic dye recording material.

EMBODIMENT

Figure 1:
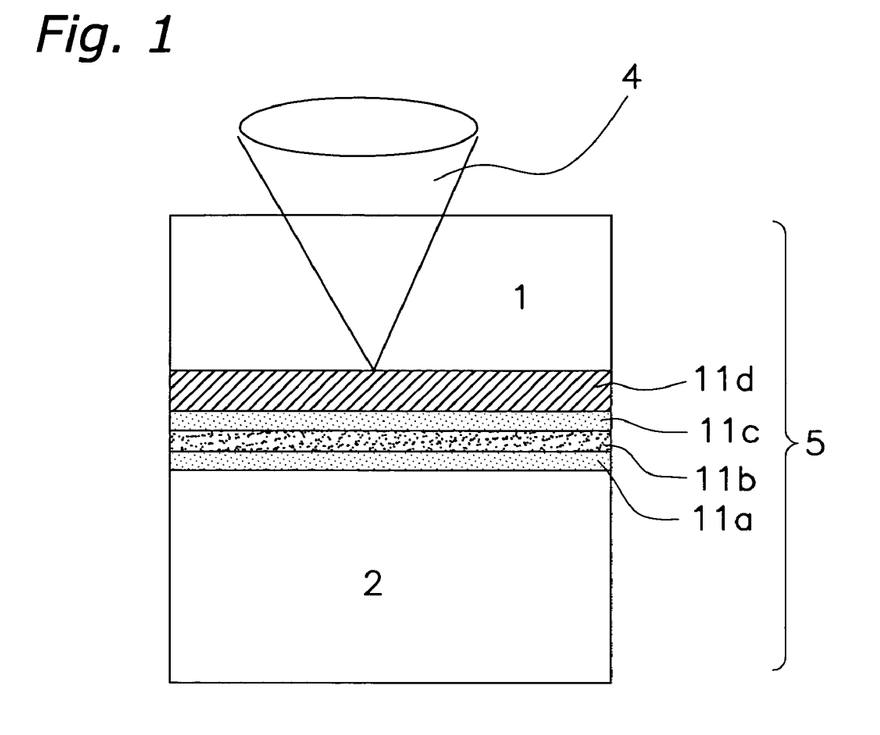
FIG. 1 is a cross-sectional diagram showing an optical disk having a single information recording layer which is used in the method of recording information of the Embodiment of the present invention.

FIG. 1 is a cross-sectional diagram showing an optical disk 5 having a single information recording layer which is used in the method of recording information of the embodiment of the present invention.

In FIG. 1, reference numeral 11a is a front-side dielectric layer, reference numeral 11c is a back-side dielectric layer, reference numeral 11b is a recording layer, reference numeral 11d is a reflecting layer, reference numeral 1 is a substrate and reference numeral 2 is a cover layer. The single-layer optical disk 5 was formed by the following procedure. On the transparent substrate 1 made of a polycarbonate with 1.1 mm thickness and having a tracking groove, the reflecting layer 11d made of Al alloy with a thickness of 40 nm, a $ZnS-SiO_2$ back-end dielectric layer 11c with a thickness of 30 nm, a Te—O—Pd recording layer 11b with a thickness of 20 nm and a $ZnS-SiO_2$ front-side dielectric layer 11a with a thickness of 40 nm were formed in this order using a vacuum sputtering method. Then, the transparent cover layer 2 with a thickness of 0.1 mm made of polycarbonate was adhered using an adhesive, not shown in the figure.

The reflecting layer 11d also functions as a light absorption layer. In this example, a laser beam 4 for recording identification data of a medium was applied from the side of the substrate 1, and user data was recorded by applying the laser from the side of the cover layer 2.

Figure 2:
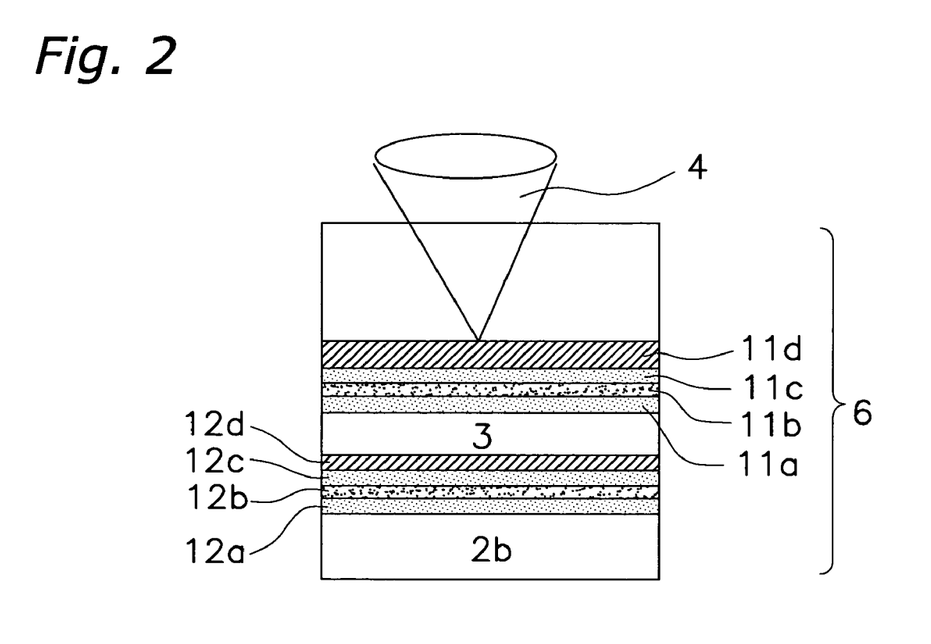
FIG. 2 is a cross-sectional diagram showing an optical disk having two information recording layers which is used in the method of recording information of the Embodiment of the present invention.

FIG. 2 is a cross-sectional diagram showing an optical disk 6 having two information recording layers which was used in the method of recording information of the embodiment of the present invention.

In FIG. 2, reference numeral 12a is a front-side dielectric layer of a second layer, reference numeral 12c is a back-side dielectric layer of the second layer, reference numeral 12b is a recording layer of the second layer, reference numeral 12d is a reflecting layer of the second layer, reference numeral 1 is the substrate, reference numeral 3 is an intermediate layer and reference numeral 2b is a cover layer. The double-layer optical disk 6 was formed by the following procedures. As in the procedure for forming the single-layer optical disk, on the transparent substrate 1, the reflecting layer 11d, the back-end dielectric layer 11c, the recording layer 11b and the front-side dielectric layer 11a were formed in this order using the vacuum sputtering method. Then, the intermediate layer 3 having a thickness of 25 µm made of UV setting resin was formed. After that, the reflecting layer made of Al alloy of the second layer 12d with a thickness of 10 nm, the ZnS—SiO$_2$ back-side dielectric layer of the second layer 12c with a thickness of 15 nm, the Te—O—Pd recording layer of the second layer 12b with a thickness of 10 nm and the ZnS—SiO$_2$ front-side dielectric layer of the second layer 12a with a thickness of 20 nm were formed in this order using the vacuum sputtering method. Then, the transparent cover layer 2b made of polycarbonate with a thickness of 0.075 mm was adhered using an adhesive, not shown in the figure. In this example, the laser beam 4 for recording identification data of a medium was applied from the side of the substrate 1, and user data was recorded by applying the laser from the side of the cover layer 2.

Figure 3:
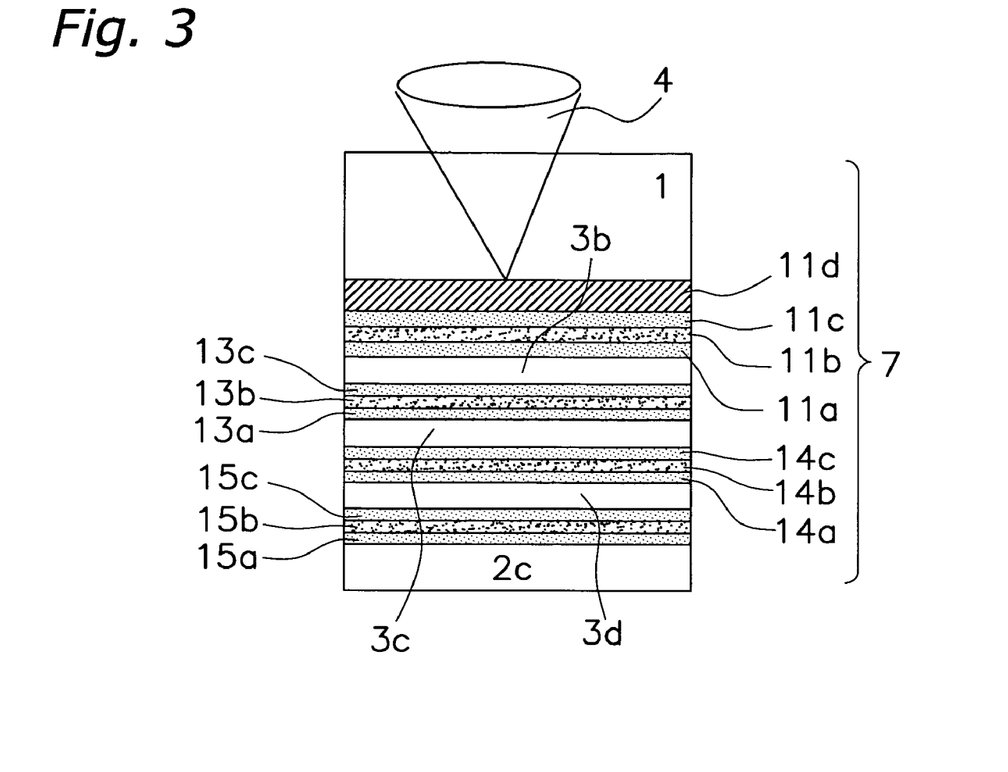
FIG. 3 is a cross-sectional diagram showing an optical disk having four information recording layers which is used in the method of recording information of the Embodiment of the present invention.

FIG. 3 is a cross-sectional diagram showing an optical disk 7 having four information recording layers which is used in the method of recording information of the embodiment of the present invention.

In FIG. 3, reference numeral 13a is a front-side dielectric layer of a second layer, reference numeral 13c is a back-side dielectric layer of the second layer, reference numeral 13b is a recording layer of the second layer, reference numeral 14a is a front-side dielectric layer of a third layer, reference numeral 14c is a back-side dielectric layer of the third layer, reference numeral 14b is a recording layer of the third layer, reference numeral 15a is a front-side dielectric layer of a fourth layer, reference numeral 15c is a back-side dielectric layer of the fourth layer, reference numeral 15b is a recording layer of the fourth layer, reference numeral 1 is the substrate, reference numerals 3b, 3c and 3d are intermediate layers, and reference numeral 2c is a cover layer. The quadruple-layer optical disk 7 was formed by the following procedures. As in the procedure for forming the single-layer optical disk, on the transparent substrate 1, the reflecting layer 11d, the back-side dielectric layer 11c, the recording layer 11b and the front-side dielectric layer 11a were formed in this order by using the vacuum sputtering method. Then, the intermediate layer 3b with a thickness of 15 µm made of UV setting resin was formed. After that, the ZnS—SiO$_2$ back-side dielectric layer of the second layer 13c with a thickness of 10 nm, the Te—O—Pd recording layer of the second layer 13b with a thickness of 15 nm and the ZnS—SiO$_2$ front-side dielectric layer of the second layer 13a with a thickness of 20 nm were formed in this order using the vacuum sputtering method. Then, the intermediate layer 3c with a thickness of 15 µm made of UV setting resin was formed. Then, the ZnS—SiO$_2$ back-side dielectric layer of the third layer 14c with a thickness of 5 nm, the Te—O—Pd recording layer of the third layer 14b with a thickness of 10 nm and the front-side dielectric layer of the third layer 14a with a thickness of 15 nm were formed in this order using the vacuum sputtering method. Further, the intermediate layer 3d with a thickness of 15 µm made of UV setting resin was formed. Then, the ZnS—SiO$_2$ back-side dielectric layer of the fourth layer 15c with a thickness of 5 nm, the Te—O—Pd recording layer of the fourth layer 15b with a thickness of 10 nm and the ZnS—SiO$_2$ front-side dielectric layer of the fourth layer 15a with a thickness of 15 nm were formed in this order using the vacuum sputtering method. Additionally, the transparent cover layer 2c made of polycarbonate with a thickness of 0.06 mm was adhered using an adhesive, not shown in the figure.

In this example, the laser beam 4 for recording identification data of a medium was applied from the side of the substrate 1, and user data was recorded by applying the laser from the side of the cover layer 2.

Figure 4:
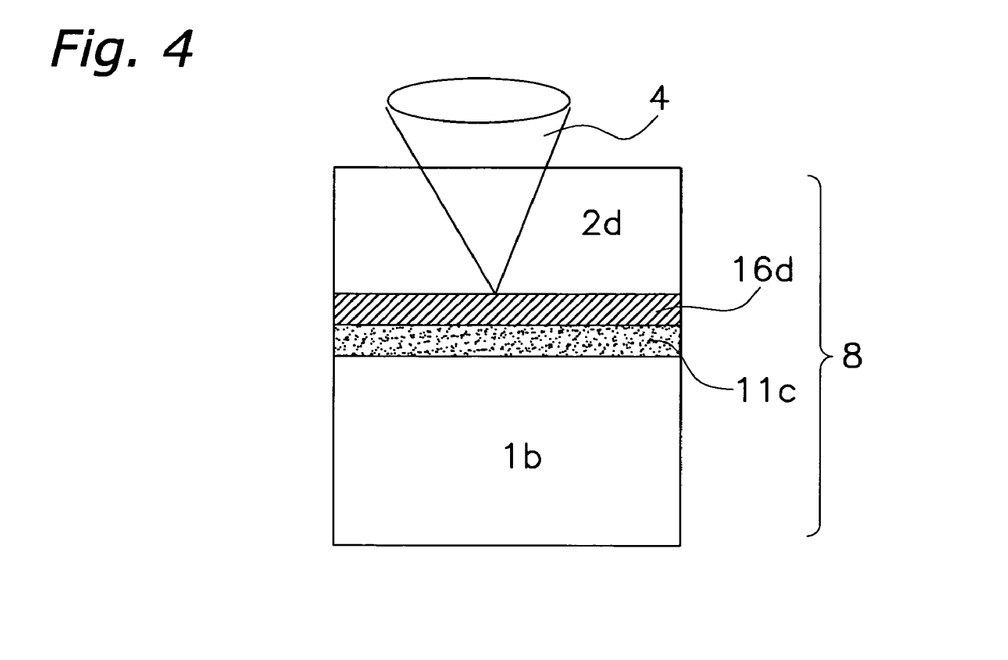
FIG. 4 is a cross-sectional diagram showing a coat-type optical disk which is used in the method of recording information of the Embodiment of the present invention.

FIG. 4 is a cross-sectional diagram showing a coat-type optical disk 8 which is used in the method of recording information of the embodiment of the present invention.

In FIG. 4, reference numeral 16b is a recording layer, reference numeral 16d is a reflecting layer, reference numeral 1b is a coat-type substrate and reference numeral 2d is a dummy substrate. The coat-type optical disk 8 was formed by the following procedures. On the transparent coat-type substrate 1b made of polycarbonate with a thickness of 0.6 mm and having a tracking groove, an azo organic dye was coated to an average thickness of 100 nm using a spin coating method, and then the reflecting layer made of Al alloy 16d with a thickness of 60 nm was formed using the vacuum sputtering method. Additionally, the dummy substrate 2d made of polycarbonate with a thickness of 0.6 mm was adhered using an adhesive, not shown in the figure. In the embodiment of the present invention, the laser beam 4 for recording identification data of a medium was applied from the side of the dummy substrate 2d, and the laser beam for recording user data was applied from the side of the coat-type substrate 1b.

Figure 5:
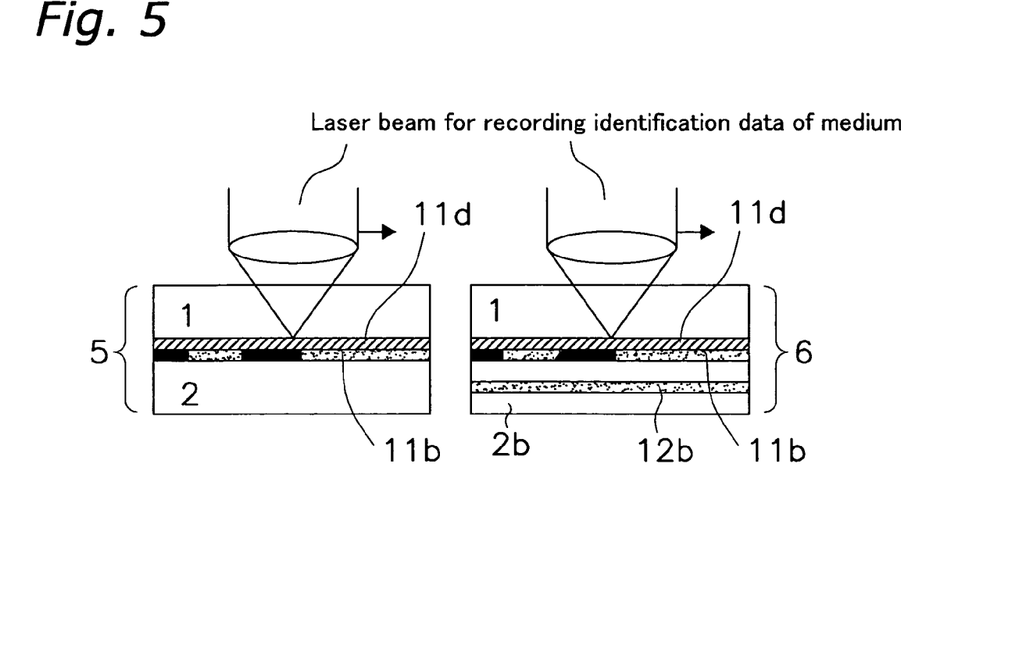
FIG. 5 is a diagram showing an example of the method of recording information of the Embodiment of the present invention.

FIG. 5 is a diagram showing an example of the method of recording information of the embodiment of the present invention. Note that, for easy understanding, parts of the structural components are omitted.

The identification data of a medium are signals, the signals being in accordance with each production number of each disk, and the signals are recorded as a barcode on part of a lead-in area of a disk. In FIG. 5, the incident side of the laser beam for recording identification data on the single-layer optical disk 5 and the double-layer optical disk 6 is the side opposite to the substrate 1 where user data is recorded. From this structure, even in the double-layer optical disk 6, although the identification data is recorded on the recording layer of a first layer 11b, the recording is not affected by the recording layer of a second layer 12b and the like. Therefore, in the double-layer optical disk 6, identification data of a medium can be recorded under the same conditions as the single-layer optical disk 5.

Figure 12:
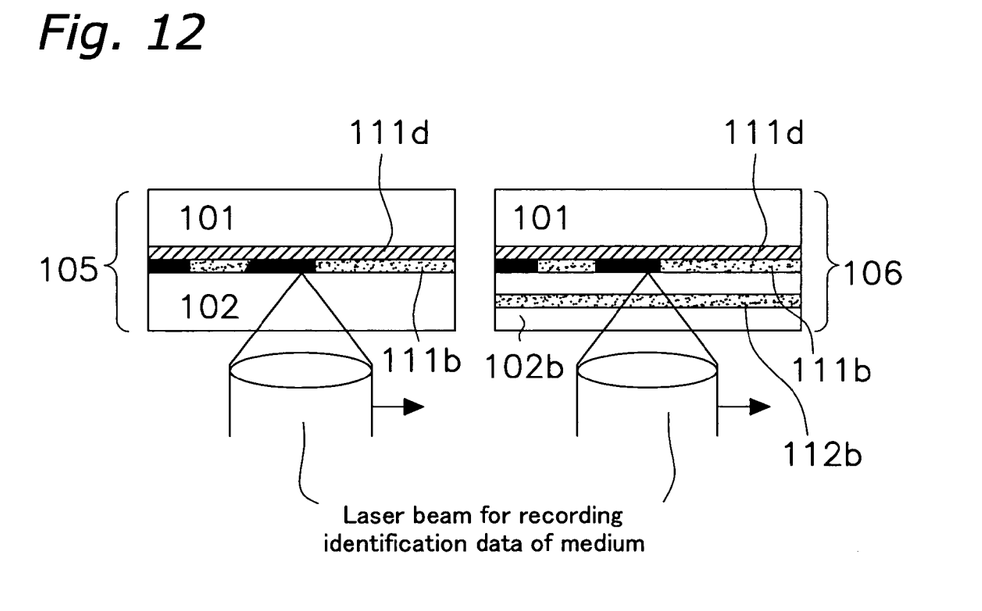
FIG. 12 is a diagram showing an example of a conventional method of recording information.

FIG. 12 is a diagram showing an example of a conventional method of recording information for comparison.

In FIG. 12, the incident sides of the laser beam for recording identification data on the single-layer optical disk 105 and the double-layer optical disk 106 are the sides of the cover layers 102 and 102b, which are the same as for recording the user data. In the double-layer optical disk 106, the identification data is recorded on a recording layer of a first layer 111b, and the recording is affected by the recording layer of a second layer 112b and the like. Therefore, in the double-layer optical disk 106, identification data needs to be recorded under conditions different from that of the single-layer optical disk 105.

Figure 6:
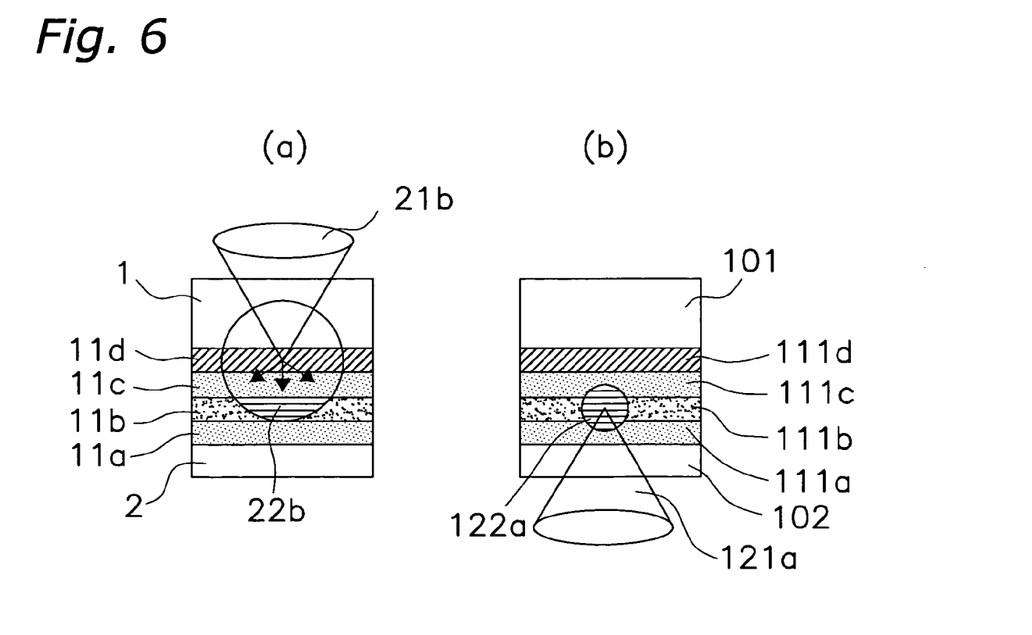

FIG. 6 is an explanatory diagram showing a recording mechanism of the embodiment of the present invention.

In FIG. 6, reference letter (b) shows a conventional method of recording identification data of a medium. Because a laser beam 121a directly focuses on and heats the recording layer 111b, the layer 111b gets heat damaged, and the shape of a recording mark 122a is changed. Reference letter (a) shows an indirect heat recording method of the present invention. A laser beam 21b for recording the identification data heats the reflecting layer 11d, which is also a light absorption layer, by heat conduction or heat radiation. An advantage of the method is that the recording layer does not receive a drastic heat change, and it is difficult to cause physical damage to the recording layer or the substrate. In addition, in the laser beam 21b, if a larger beam spot is used for recording data on the reflecting layer 11d, then power density decreases and the advantage further improves.

Figure 7:
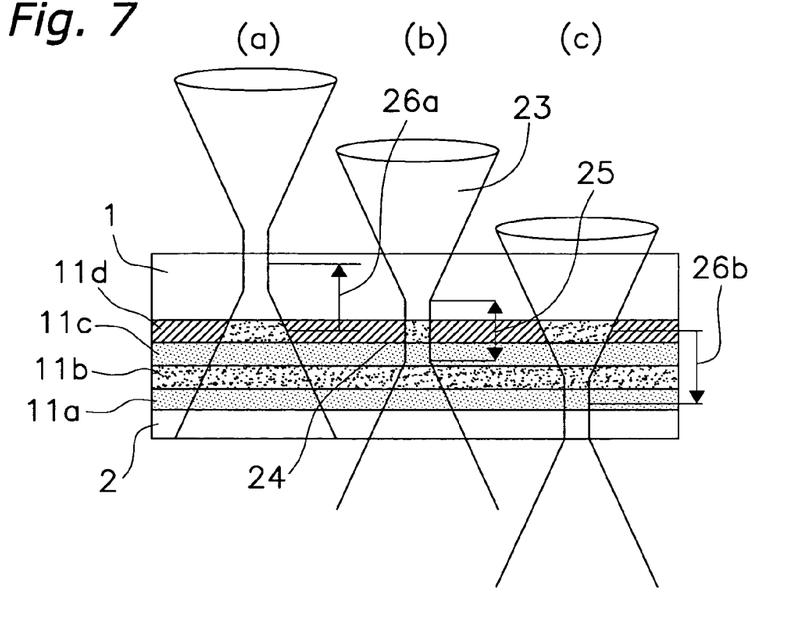
FIG. 7 is an explanatory diagram showing a defocus recording of the Embodiment of the present invention.

FIG. 7 is an explanatory diagram showing a recording using a defocused beam (hereinafter referred to as a defocus recording) of the embodiment of the present invention.

In FIG. 7, reference letter (b) shows a situation in which the laser focuses on the reflecting layer 11d. Reference numeral 23 is a laser beam for recording identification data of a medium, reference numeral 24 is a heated portion of the reflecting layer, reference numeral 25 is the focusing depth. Reference letter (a) shows a situation in which the laser defocuses at the front-side of the disk, reference numeral 26a therein shows the amount of defocus at the front-side. Reference letter (c) shows a situation in which the laser defocuses at the back-side of the disk, reference numeral 26b therein shows the amount of defocus at the back-side. A heated portion of the reflecting layer 24 in (b) is highly focused. On the other hand, because reference numeral 24 in (a) and (c), which is in a defocused state, spreads out and power density thereof decreases, identification data of a medium can be recorded more stably on the recording layer 11b. If the amount of defocusing is too small, the effect of defocusing the beam can not be obtained. On the other hand, if it is too large, a high recording power is necessary.

Generally, a focusing depth Δs is described as follows:

$$\Delta s = \lambda/(NA)^2$$

Here, λ is wavelength of the laser and NA is numerical aperture of the lens.

Figure 8:
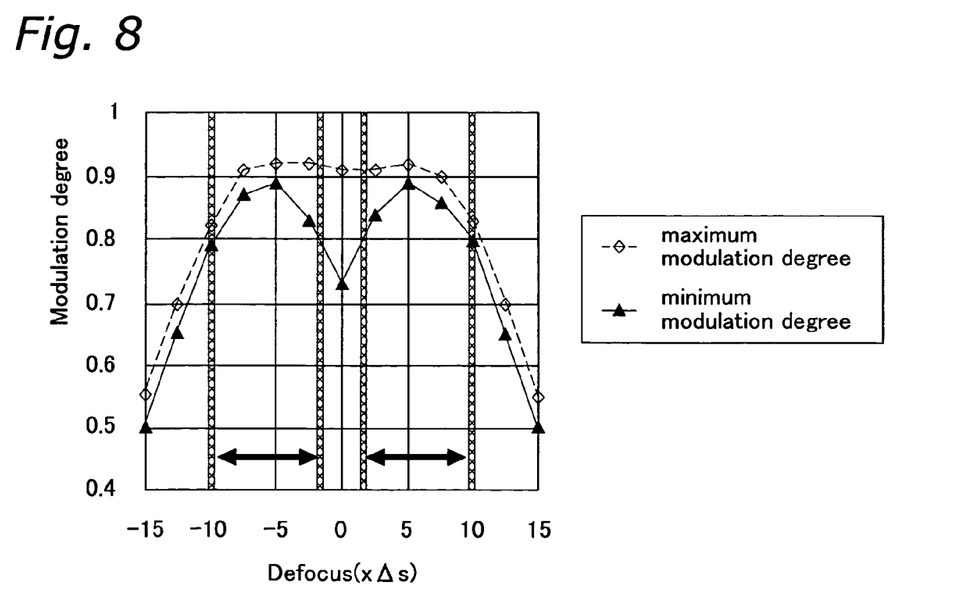
FIG. 8 shows the defocusing effects of the Embodiment of the present invention.

FIG. 8 shows the effects of defocusing the beam of the embodiment of the present invention. A double-layer medium is used as a sample, and the laser incident side is the side opposite to the surface where the user data is recorded.

From FIG. 8, the minimum modulation degree without a defocus (defocus 0) is 0.73; however, the modulation degree improves when defocus increases. When the amount of defocus is less than −10×Δs or over +10×Δs, a suitable modulation degree can not be obtained because the energy diffuses excessively and the temperature does not rise enough during the recording. From the results, the amount of defocus showing particularly favorable properties ranged between −2×Δs and −10×Δs or +2×Δs and +10×Δs.

As other ways to decrease power density, the following methods can also be feasible, such as decreasing NA of the lens and intentionally causing aberration of the lens.

However, during the recording, the size (width) of the focusing spot of the laser beam needs to be narrower than the size (width) of the shortest mark of the identification data. The reason is that, because information is indirectly recorded on the recording layer by heat propagation, the recording mark tends to be larger, and this effect needs to be reduced.

In addition, in the recording method of the present invention, because information is indirectly recorded by heating the light absorption layer, the light absorption property of the recording material of the recording layer can be neglected. Thus, in the recording layer using an organic dye, heat recording becomes feasible regardless of whether it is with or without absorption at the recording wavelength.

Figure 9:
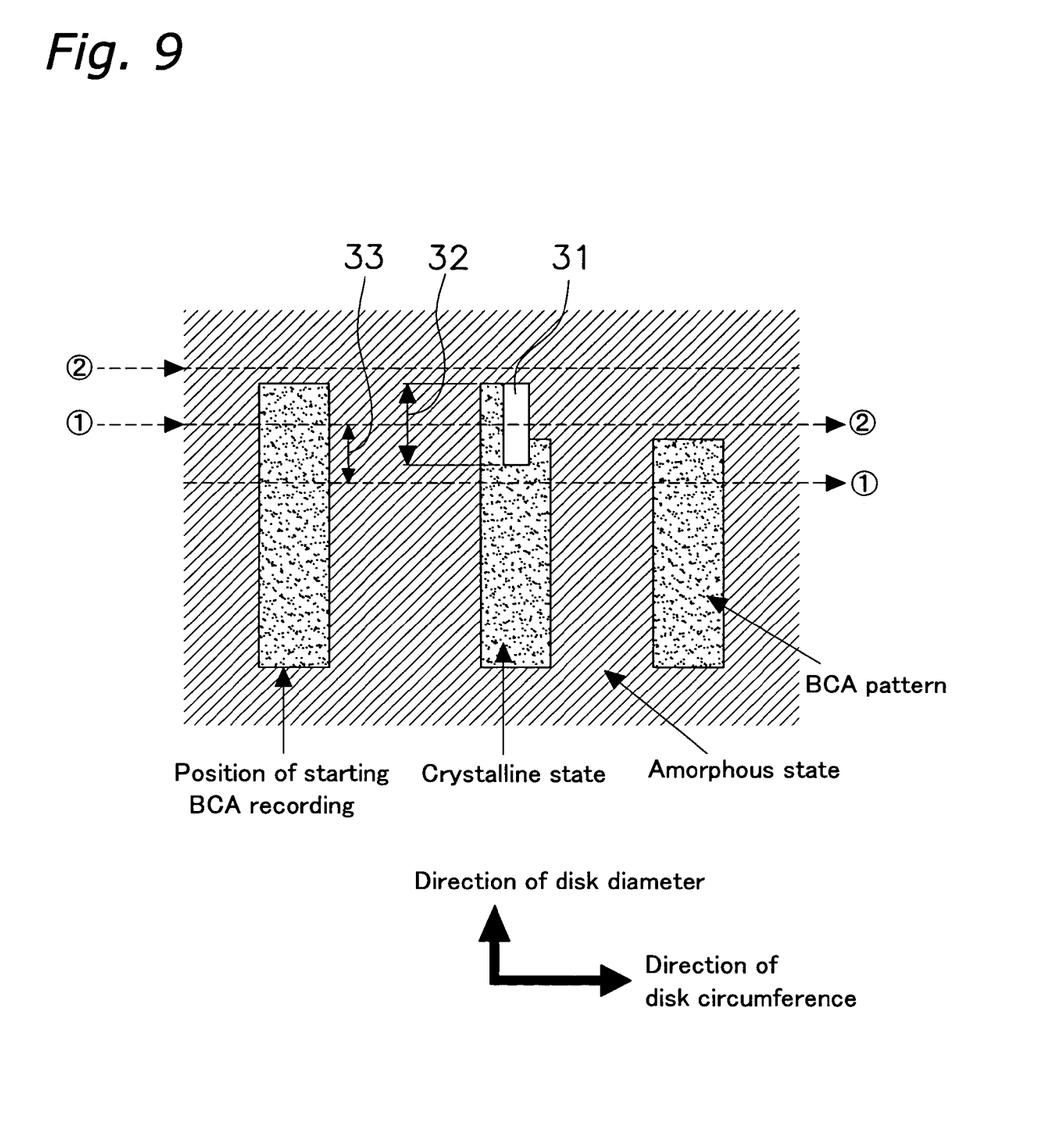
FIG. 9 is an explanatory diagram showing an example of the method of recording information of the Embodiment of the present invention.

FIG. 9 is an explanatory diagram showing an example of the method of recording information of the embodiment of the present invention.

In FIG. 9, reference numeral 31 is a focusing spot of the laser beam, reference numeral 32 is a length in the direction of the diameter of the focusing spot and reference numeral 33 is the travel distance of an optical pickup per disk rotation. In the embodiment of the present invention, the recording is performed by transforming an amorphous state into a crystalline state using the laser focusing spot 31 which is longer in the radial direction. Then a BCA pattern is completed by repeating the recording, each time adding a portion of the BCA pattern which is equal to the length of the travel distance of the optical pickup per disk rotation 33.

Figure 10:
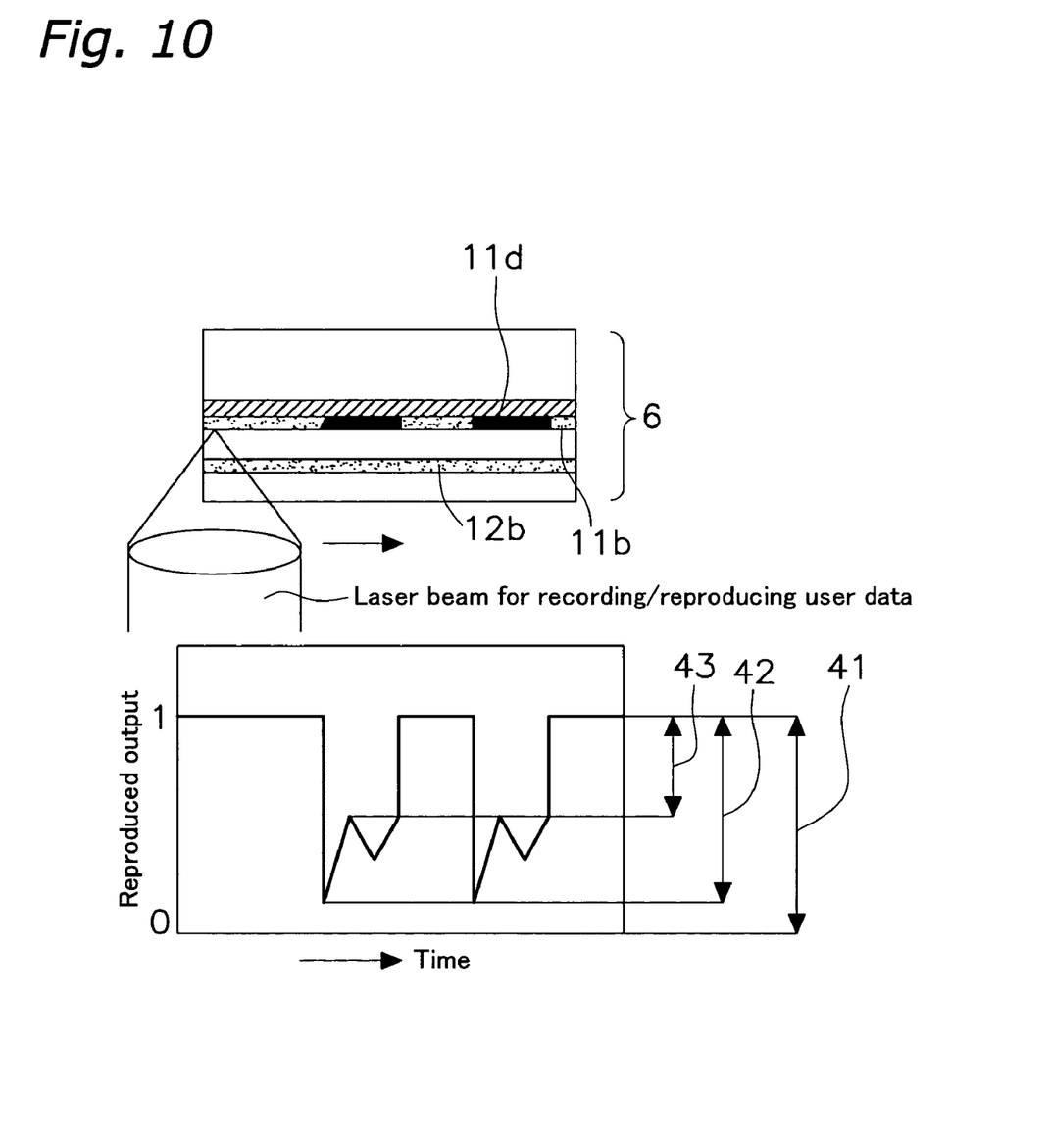
FIG. 10 is a diagram showing a reproducing signal of the identification data of a medium.

FIG. 10 is a diagram showing a reproducing signal of identification data of a medium.

In FIG. 10, reference numeral 41 is an unrecorded output, reference numeral 42 is the maximum modulation degree showing the depth of a recorded mark when the depth of an unrecorded output 41 is defined as 1, and 43 is the minimum value of the modulation degree. Here, a pickup for recording/reproducing user data is used again. The quality of a reproducing signal is favorable when values of the degree 42 and the degree 43 are large, and also a difference between both the degrees is small.

Using the single-layer optical disk 5, the double-layer optical disk 6, the quadruple-layer optical disk 7 and the coat-type optical disk 8 which are shown in FIG. 1 through FIG. 4, the signal qualities when recording and reproducing the identification data of a medium are shown in Table 1.

Here, a laser used for the recording had a wavelength of 810 nm, the length in the direction of the diameter of the focusing spot was 48 μm, NA in the circumferential direction of the disk was 0.5, the radial travel distance per disk rotation was 6 μm, the length of the recorded mark in the circumferential direction of the disk was 17 μm and the linear velocity was approximately 6 msec. In addition, the laser wavelength of the reproducing pickup was 405 nm, NA was 0.85 and reproducing power was 0.35 mW.

TABLE 1

| Experiment | | Sample | Incident side of a | Defocus × | Power | Modulation degree | | |
|---|---|---|---|---|---|---|---|---|
| No. | Contents | medium | laser | Δs | (mW) | Max. | Min. | Decision |
| 1 | Example of the present invention | 5 | Back | 0 | 1900 | 0.92 | 0.70 | Good |
| | | 6 | Back | 0 | 1900 | 0.91 | 0.73 | Good |
| | | 7 | Back | 0 | 1900 | 0.91 | 0.70 | Good |
| | | 8 | Back | 0 | 2400 | 0.70 | 0.63 | Good |
| 2 | Example of the present invention | 5 | Back | −5 | 2000 | 0.90 | 0.87 | Very good |
| | | 6 | Back | −5 | 2000 | 0.92 | 0.89 | Very good |
| 3 | Example of the present invention | 5 | Back | +5 | 2000 | 0.91 | 0.85 | Very good |
| | | 6 | Back | +5 | 2000 | 0.92 | 0.89 | Very good |
| 4 | Example of the conventional method | 5 | Front | 0 | 1100 | 0.93 | 0.39 | Bad |
| | | 6 | Front | 0 | 1900 | 0.94 | 0.42 | Bad |
| | | 7 | Front | 0 | 2800 | 0.87 | 0.41 | Bad |

In Table 1, Experiment No. 1 shows results without the defocusing and when the identification data was recorded from the side opposite (a back-side) to where user data is recorded. Experiment No. 2 shows results in which the recording was performed by setting a relative distance between a focusing lens for recording and an optical disk as an additional 5×Δs (a defocus) further away than the relative distance of Experiment No. 1. In contrast, Experiment No. 3 shows results in which the recording was performed by setting the relative distance as 5×Δs (a defocus) closer than the relative distance of Experiment No. 1. Experiment No. 4 shows the results of using a conventional method in which the identification data is recorded from the side (the front-side) at which user data is recorded.

In the conventional example, the recording power was different in the single-layer disk, the double-layer disk and the quadruple-layer disk. In addition, the minimum modulation degree was small at approximately 0.4, and the difference between the minimum and maximum degree was large. On the contrary, in the example of the present invention, the recording power was the same in the single-layer disk, the double-layer disk and the quadruple-layer disk. The minimum modulation degree was 0.6 or more, and the difference between the minimum and maximum degree was smaller than that of the conventional example. In the coat-type medium, the difference was small. In Experiments No. 2 and No. 3 defocusing was performed, the difference between the minimum and maximum modulation degree was further reduced, and a stable recording of the identification data was achieved.

As mentioned above, in the example of the present invention, the laser beam for recording identification data of a medium on an optical disk is applied from the opposite side of the substrate to where user data is recorded. From this structure, even in a multiple-layer optical disk, the identification data can be recorded under the same recording conditions as a single-layer optical disk because the disk is not affected by a second or subsequent recording layer. In addition, because the recording on the recording layer is performed through the reflecting layer, transformation of the recording layer caused by a drastic temperature change is reduced and stable recording becomes feasible. Moreover, by defocusing the laser beam onto the recording layer within a given range, drastic temperature change is reduced and stable recording is further feasible. In addition, because the organic dye recording material records heat generated from the light absorption layer and is not affected by the optical absorption properties of the dye, the information can be stably recorded.

Figure 11:
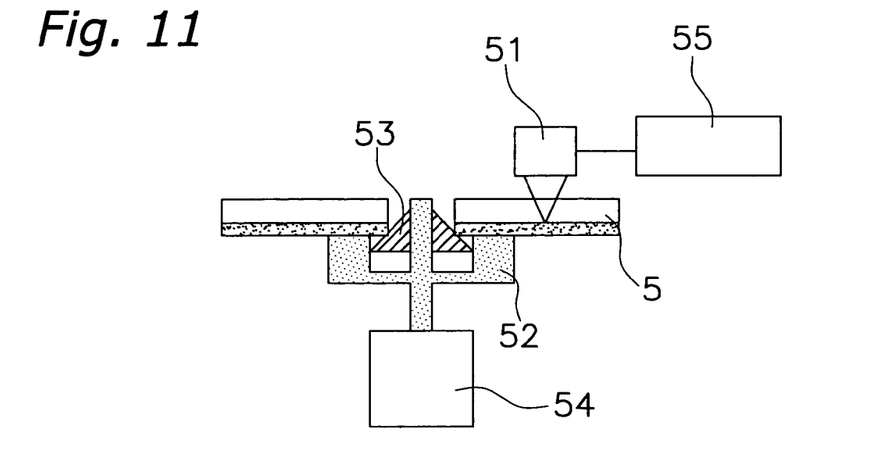
FIG. 11 is a cross-sectional diagram showing information recording equipment of the present invention.

FIG. 11 is a cross-sectional diagram showing information recording equipment of the present invention.

In FIG. 11, reference numeral 51 is an optical pickup for recording identification data of a medium, reference numeral 52 is a turn table, reference numeral 53 is a centering mechanism, reference numeral 54 is a motor and reference numeral 55 is a focusing control device. A side of the optical disk 5 for recording user data is fixed to the turn table 52 by a method not shown in the figure, and the disk rotates at a predetermined speed using the motor 54. The identification data of the medium is recorded by applying a laser beam from the optical pickup 51 onto the reflecting layer side of the optical disk 5. The optical pickup 51 is moved by a feed mechanism not shown in the figure, and the recorded area increases in a radial direction, then the BCA is completed. The information recording equipment of the present invention has a centering mechanism 53 which corrects the center position at an inner zone on the opposite side of the disk where the laser beam for recording identification data enters. Therefore, when the optical pickup 51 from which the laser is applied vertically downward is used (for safety reasons), because the centering can be performed at the opposite side to where the optical pickup operates, information recording equipment which is superior for mass-production is achieved. For example the disk 5 can be fixed on the turn table 52 using air suction. Furthermore, the equipment of the present invention has a focusing control device 55, and the amount of focus can be set up to ±10 times longer than the focusing depth. Because transformations of the recording layer and the substrate caused by a drastic heat change during the recording can be reduced by adjusting the power density of the laser spot, the identification data can be recorded favorably and stably.

The embodiment described above shows an example of the present invention, and it does not limit the performance of the present invention. Various changes are possible without extending beyond the contents of the invention.

In the method of recording information of the present invention, identification data of a medium can be recorded easily and stably, and the method is useful for recording a BCA pattern on an optical disk and the like. In addition, the method can be applied to an optical tape and an optical card, for example.

What is claimed is:

1. A method of recording information on a disk-shaped information recording medium having an information recording layer comprising a recording layer and a light absorption layer, user data being recorded/reproduced only in one direction using a first laser beam, the recording layer being comprised of a write-once type recording material, the method comprising:

recording medium identification data by applying a second laser beam from a side of the medium opposite to a side of the medium from where user data is recorded/reproduced; and reproducing the medium identification data by applying the first laser beam, wherein the light absorption layer is located between a surface of the side opposite to where user data is recorded/reproduced and the recording layer, and wherein the recording of medium identification data comprises indirectly recording the medium identification data only on the recording layer by heat propagation caused by heating the light absorption layer using the second laser beam, wherein the light absorption layer does not serve as a recording portion for the second laser beam and serves to improve a reflectivity against the first laser beam.

2. The method of recording information of claim 1, wherein a width of a focusing spot of the second laser beam which is applied to the light absorption layer during the recording is narrower than that of a shortest mark of the medium identification data.

3. The method of recording information of claim 1, wherein the second laser beam is defocused on the light absorption layer.

4. The method of recording information of claim 3, wherein a defocus range is between two and ten times longer than a focusing depth.

5. The method of recording information of claim 1, wherein the recording layer is comprised of a phase-changeable recording material.

6. The method of recording information of claim 5, wherein the recording layer is comprised of a write-once phase-changeable recording material; and the medium identification data is recorded by transforming a non-crystalline phase of the recording layer into a crystalline phase.

7. The method of recording information of claim 1, wherein the recording layer is comprised of an organic dye recording material.

8. An information recording medium comprising:

an information recording layer on a disk-shaped substrate, the information recording layer comprising a recording layer and a light absorption layer, wherein medium identification data is recorded by applying a second laser beam from a side of the medium opposite to a side of the medium from where user data is recorded/reproduced, the user data being recorded/reproduced only in one direction using a first laser beam, wherein the medium identification data is reproduced by applying the first laser beam, the recording layer being comprised of a write-once type recording material, wherein the light absorption layer is located between a surface of the side opposite to where user data is recorded/reproduced and the recording layer, wherein the light absorption layer is to be heated using the second laser beam so as to indirectly record the medium identification data only on the recording layer by heat propagation, wherein the light absorption layer does not serve as a recording portion for the second laser beam and serves to improve a reflectivity against the first laser beam.

9. The information recording medium of claim 8, wherein the recording layer is made of a phase-changeable recording material.

10. The information recording medium of claim 8, wherein the recording layer is made of an organic dye recording material.

11. A method of manufacturing an information recording medium, comprising:

forming an information recording layer on a disk-shaped substrate, the information recording layer comprising a light absorption layer and a recording layer comprised of a write-once type recording material;

recording medium identification data on the recording layer by applying a second laser beam from a side of the medium opposite to a side of the medium from where user data is recorded/reproduced, the user data being recorded/reproduced only in one direction using a first laser beam; and reproducing the medium identification data by applying the first laser beam, wherein the forming of the information recording layer comprises forming the light absorption layer between a surface of the side opposite to where user data is recorded/reproduced and the recording layer, wherein the recording of medium identification data comprises indirectly recording the medium identification data only on the recording layer by heat propagation caused by heating the light absorption layer using the second laser beam, wherein the light absorption layer does not serve as a recording portion for the second laser beam and serves to improve a reflectivity against the first laser beam.

* * * * *